(12) United States Patent
Hsieh et al.

(10) Patent No.: US 12,241,198 B2
(45) Date of Patent: Mar. 4, 2025

(54) DEVICE AND METHOD OF FLATTENING RECYCLED CARBON FIBER MATERIAL

(71) Applicant: NATIONAL KAOHSIUNG UNIVERSITY OF SCIENCE AND TECHNOLOGY, Kaohsiung (TW)

(72) Inventors: Tsung-Han Hsieh, Kaohsiung (TW); I-Hsin Wang, Kaohsiung (TW); Ting-Yu Chang, Kaohsiung (TW); Bo-Wei Guo, Kaohsiung (TW)

(73) Assignee: National Kaohsiung University of Science and Technology, Kaohsiung (TW)

( * ) Notice: Subject to any disclaimer, the term of this patent is extended or adjusted under 35 U.S.C. 154(b) by 160 days.

(21) Appl. No.: 18/048,800

(22) Filed: Oct. 21, 2022

(65) Prior Publication Data
US 2023/0374725 A1 Nov. 23, 2023

(30) Foreign Application Priority Data
May 19, 2022 (TW) .................................. 111118730

(51) Int. Cl.
*D06M 10/02* (2006.01)
*B29C 43/00* (2006.01)
(Continued)

(52) U.S. Cl.
CPC ........... *D06M 10/02* (2013.01); *B29C 43/003* (2013.01); *B29C 43/02* (2013.01); *B29C 43/32* (2013.01);
(Continued)

(58) Field of Classification Search
CPC .... B29C 2043/3266; B29C 2043/3636; B29C 2791/008; B30B 11/022; D06M 10/02; D06M 2101/40
See application file for complete search history.

(56) References Cited

U.S. PATENT DOCUMENTS 5,262,103 A * 11/1993 LaPoint .................. B29C 43/16
264/122
9,073,239 B2 * 7/2015 Banus ..................... B29C 33/38
(Continued)

FOREIGN PATENT DOCUMENTS

CN 106626437 A * 5/2017 ............. B29C 33/00
GB 2290045 A * 12/1995 ........... B29C 43/021
(Continued)

*Primary Examiner* — Atul P. Khare
(74) *Attorney, Agent, or Firm* — Rosenberg, Klein & Lee

(57) ABSTRACT

A device and a method of flattening recycled carbon fiber material are provided. A main body is provided with two flat plates at an upper and a lower positions corresponding to each other and an ultrasonic unit is disposed on each of the flat plates. While in use, recycled carbon fiber material is placed at the lower flat plate and then at least one ultrasonic probe of the ultrasonic unit is driven to work and vibrate the recycled carbon fiber material into a flat and thin state. After the flattened recycled carbon fiber material being pressurized to form products required, the product has flat and smooth surfaces with special textures. A thickness of the product can be controlled and the product can be thinned according to users' needs, without surface treatment such as grinding, polishing, etc. Thereby production cost is reduced and yield rate of the products is improved.

7 Claims, 4 Drawing Sheets

(51) Int. Cl.
  *B29C 43/02*  (2006.01)
  *B29C 43/32*  (2006.01)
  *B29C 43/56*  (2006.01)
  *B29C 53/80*  (2006.01)
  *B30B 11/02*  (2006.01)
  *B29C 43/36*  (2006.01)
  *D06M 101/40* (2006.01)

(52) U.S. Cl.
  CPC .............. *B29C 43/56* (2013.01); *B29C 53/80* (2013.01); *B30B 11/022* (2013.01); *B29C 2043/3266* (2013.01); *B29C 2043/3636* (2013.01); *B29C 2791/008* (2013.01); *D06M 2101/40* (2013.01)

(56) References Cited

U.S. PATENT DOCUMENTS

| | | | |
|---|---|---|---|
| 11,179,901 B2* | 11/2021 | Hurdle | B29C 70/48 |
| 2012/0315455 A1* | 12/2012 | Yamasaki | B29C 70/48 |
| | | | 428/221 |
| 2018/0043642 A1* | 2/2018 | Miller | B29C 70/54 |
| 2021/0394405 A1* | 12/2021 | Erceg | B29C 33/308 |

FOREIGN PATENT DOCUMENTS

| | | | | |
|---|---|---|---|---|
| JP | S63247013 A | * | 10/1988 | |
| JP | 2675995 B2 | * | 11/1997 | ............. B29C 70/06 |

* cited by examiner

DEVICE AND METHOD OF FLATTENING RECYCLED CARBON FIBER MATERIAL

BACKGROUND OF THE INVENTION

Field of the Invention

The present invention relates to a device and method of flattening recycled carbon fiber material, especially to a device and method of flattening a stack of recycled carbon fiber material.

Description of Related Art

Carbon fiber is a material with good strength, light weight, high thermal and chemical resistance so that carbon fiber is widely used in various fields such as sports equipment and transportation.

Along with various applications of the carbon fiber, related product waste is also increased steadily. Most of waste products composed of carbon fiber are buried or burned. No matter which way is used, treatment of the waste product leads to environmental pollution and waste of high-value carbon fiber material. In order to address the issues related to carbon fiber waste, carbon fiber product is recycled and fragmented according to prevailing processes and then used as low-value additives or fillers.

The recycled carbon fiber material with shorter length after the recycling process and fragmentation is mixed with resin and has good flow property when heated and pressurized, which is good for making products with complicated geometry. However, the fragmented recycled carbon fibers are uneven in length. If this recycled fiber is directly used in the production of its products, the appearance lacks smoothness, and there are some voids inside the products after forming. Thus surface treatments including grinding, polishing, etc. are necessary to make the product have flat and smooth surfaces and specific textures of the product appearance. All of these may result in high cost and low yield.

Thus there is room for improvement and a need to provide a novel device and a method of flattening recycled carbon fiber material able to solve the above problems.

SUMMARY OF THE INVENTION

Therefore, it is a primary object of the present invention to provide a device and a method of flattening recycled carbon fiber material, which make flattening of a stack of recycled carbon fiber material become more convenient for the product molding process.

In order to achieve the above object, a device for flattening recycled carbon fiber material according to the present invention mainly includes a main body, two flat plates disposed on the main body and arranged at an upper and a lower positions corresponding to each other, and an ultrasonic unit arranged at one side of each of the flat plates. While in use, recycled carbon fiber material is placed on the flat plate at the lower position and at least one ultrasonic probe of the ultrasonic unit is driven to vibrate the recycled carbon fiber material stacked on the lower flat plate into a flat and thin state. Thereby products formed by pressurization of the flattened recycled carbon fiber material have flat and smooth surfaces with special textures, without surface treatment such as grinding and polishing. The product can also be thinned with controllable thickness according to users' and product design needs. Therefore, production cost is reduced effectively and yield rate of the product is improved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
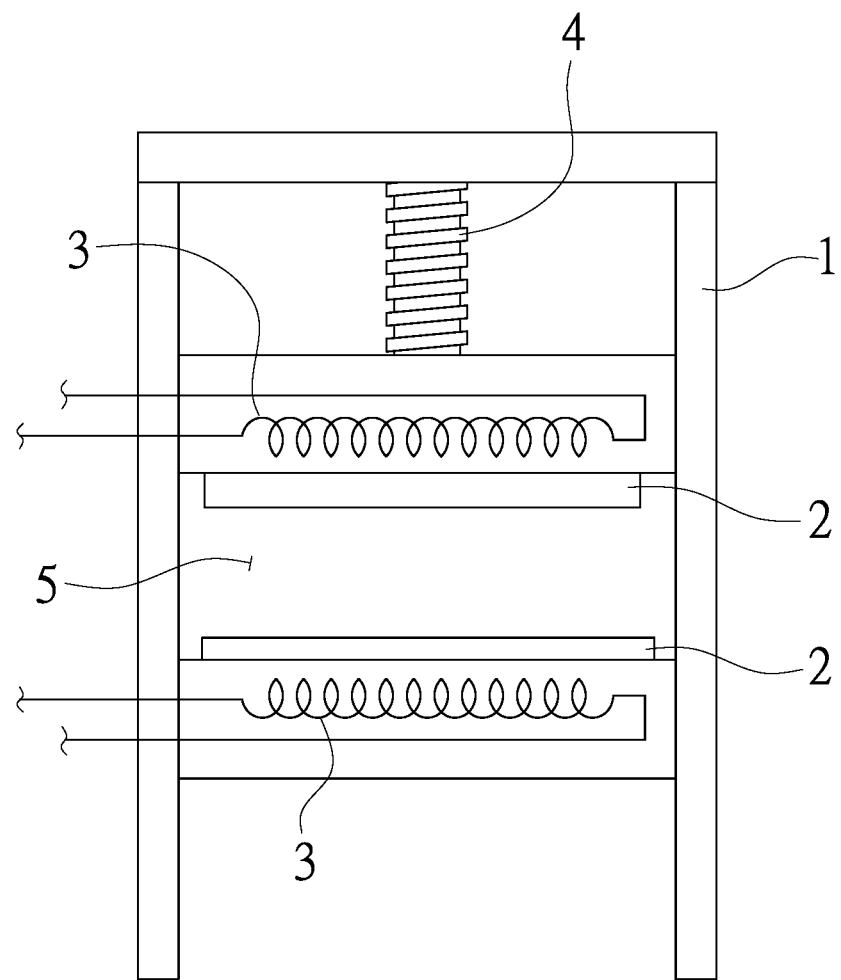
FIG. 1 is a schematic drawing showing structure of an embodiment according to the present invention.
Figure 2:
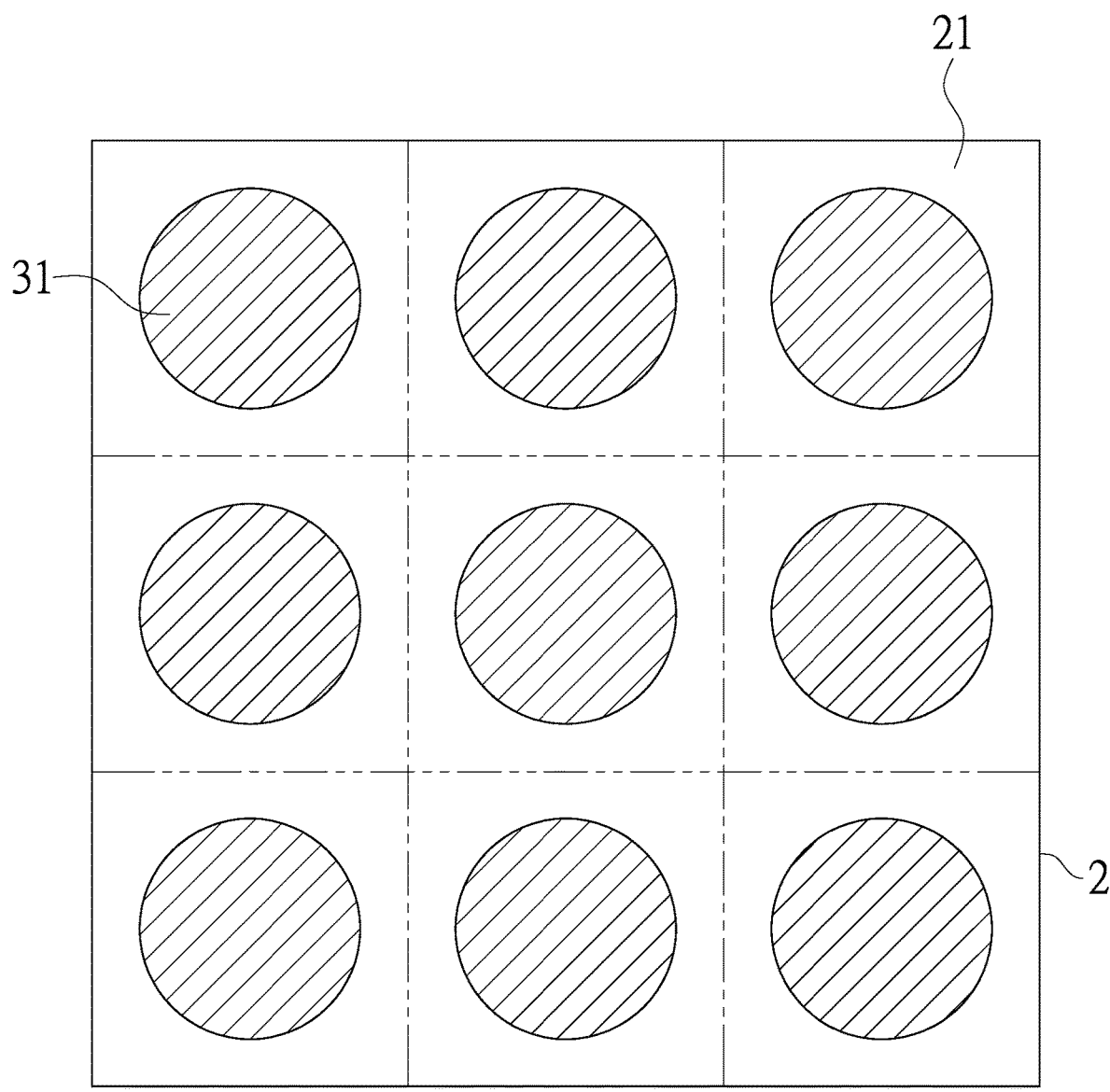
FIG. 2 is a partial top view of a section of an embodiment according to the present invention.

Refer FIG. 1 and FIG. 2, a flattening device for recycled carbon fiber materials according to the present invention includes a main body 1, two flat plates 2 arranged at an upper and a lower positions corresponding to each other and having a working area 5 therebetween, an ultrasonic unit 3 disposed on one side of each of the flat plates 2 opposite to the other side of the flat plate 2 facing the working area 5, and a lifting unit 4 mounted to the main body 1 and connected with the ultrasonic unit 3 at an upper position. Each of the flat plates 2 can be an aluminum plate provided with an area of 10 $cm^2$ and imaginarily divided into nine squares 21 arranged in a 3×3 matrix. The ultrasonic unit 3 includes at least one ultrasonic probe 31. In this embodiment, there are nine ultrasonic probes 31 disposed in a 3×3 matrix corresponding to the imaginary nine squares 21 of the flat plate 2. A frequency range of the ultrasonic probe 31 is 25-45 kHz while 25-30 kHz is preferred and an ultrasonic strength of the ultrasonic probe 31 is 300-500 Watt while 500 W is optimal.

Figure 3:
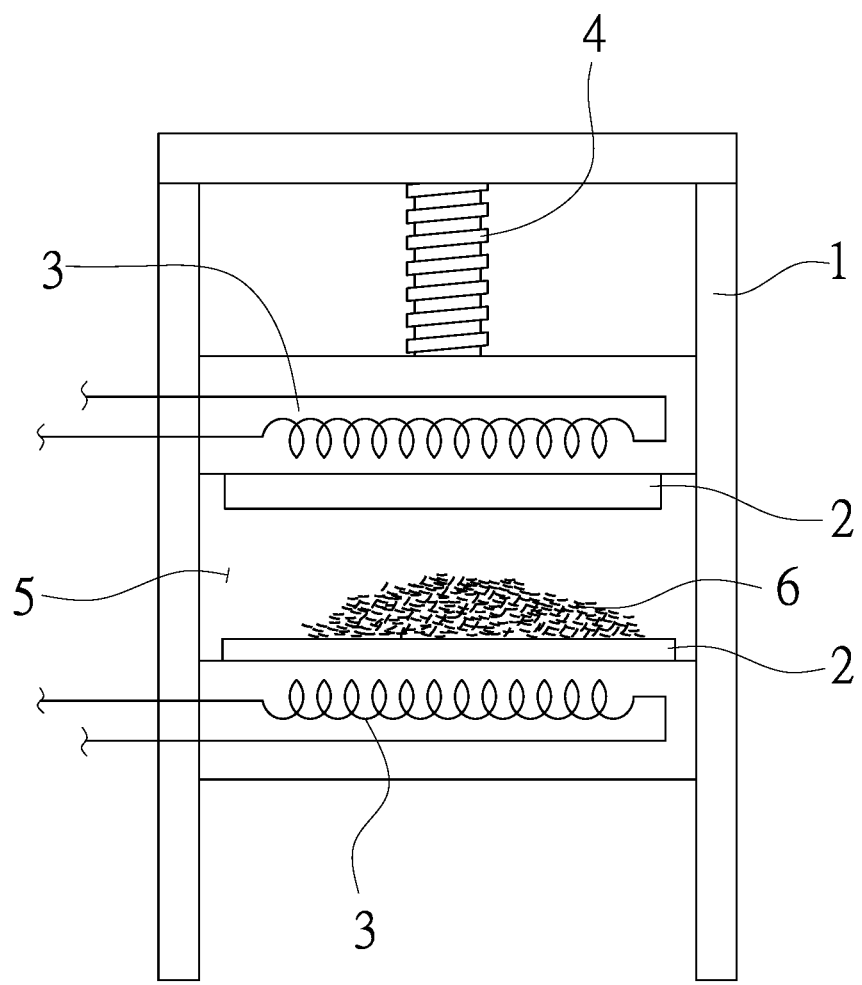
FIG. 3 is a schematic drawing showing an embodiment in use according to the present invention.
Figure 4:
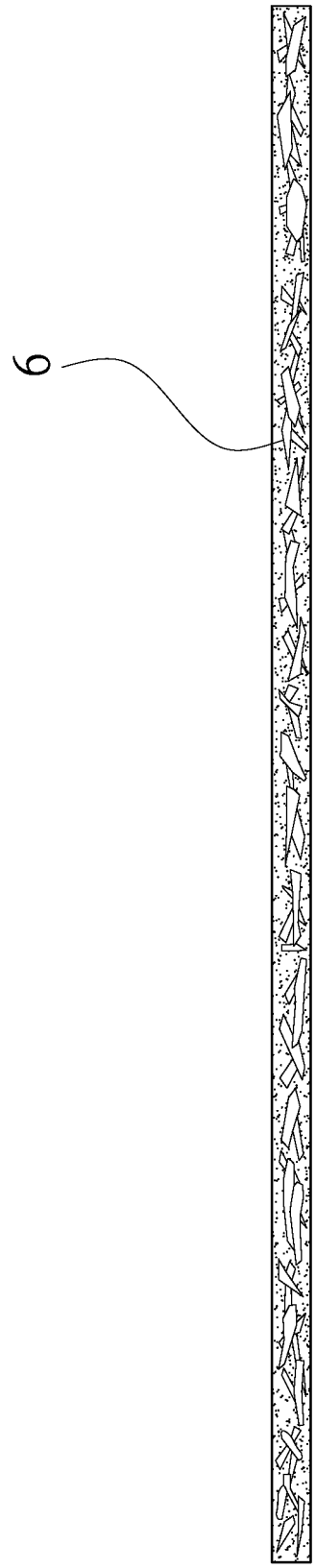
FIG. 4 is a schematic drawing showing recycled carbon fiber material of an embodiment after flattening according to the present invention.

While in use, as shown in FIG. 3, a plurality of recycled carbon fiber material 6 with short lengths is placed on the lower flat plate 2. Then the ultrasonic unit 3 is driven by the connected lifting unit 4 to descend to a certain position. Next the nine ultrasonic probes 31 on the upper and lower ultrasonic units 3 start to work and generate high frequency vibrations travelling through the recycled carbon fiber material 6 stacked on the lower flat plate 2. Thus the recycled carbon fiber material 6 stacked on the lower flat plate 2 is vibrated evenly to have a thickness of 0.4-1.2 mm, in a flat and thin state, as shown in FIG. 4. Then the flattened recycled carbon fiber material 6 is added with resin and the ultrasonic unit 3 is driven by the connected lifting unit 4 to descend again. Thus the upper flat plate 2 is pressed on the recycled carbon fiber material 6 impregnated with resin and working together with the lower flat plate 2 for applying pressure to the recycled carbon fiber material 6 impregnated with resin and shaping the recycled carbon fiber material 6 with resin into shapes required.

Thereby products with complicated structures and shapes are formed by the recycled carbon fiber material 6 conveniently due to good flowability of the recycled carbon fiber material 6 mixed with resin and set under a high pressure process. Thus economic benefits of the recycled carbon fiber material 6 are improved effectively. Moreover, the recycled carbon fiber material 6 is produced into the product after being flattened by the present device and pressurized. Thus surfaces of the product formed are flat and smooth. The product also has special surface texture formed by the mixed recycled carbon fiber material 6 to make an appearance of the product more attractive and the product has more applications. A thickness of the product can be controlled and the product can be thinned according to users' and product design needs, without surface treatment including grinding, polishing, etc. Thereby production cost is reduced and yield rate of the product is improved. Since the recycled carbon fiber material 6 is recycled material or leftover material of long carbon fiber, not only material cost of the product is significantly reduced, the problems such as environmental pollution and waste of material and resources caused by abandoned carbon fiber products can also be solved effectively.

The above embodiment is only used to illustrate the invention, not intended to limit the scope of the disclosure. The number of both the flat plate 2 and the ultrasonic unit 3 is not limited. For example, a main body 1 is only provided with one flat plate 2 and an ultrasonic unit 3 is arranged at the flat plate 2. Then a plurality of recycled carbon fiber material 6 is placed on the flat plate 2 and ultrasonic probes 31 of the ultrasonic unit 3 start to work to emit vibrations and cause vibrations of the recycled carbon fiber material 6 stacked on the flat plate 2 for flattening.

In summary, the present device and method have the following advantages:

1. A stack of recycled carbon fiber material is vibrated and flattened by the ultrasonic probes and then further pressurized and shaped into the products with required shapes. After molding, the product has flat and smooth surfaces with special texture. No surface treatment including grinding, polishing, etc. is performed. Thereby production cost is reduced effectively and yield rate of the product is increased.
2. The recycled carbon fiber material is processed and produced into various products after being flattened conveniently by the present device and method. The products not only have better appearance and more applications but also can be thinned to have the thickness required. Thereby the material cost is lowered and environmental issues caused by waste of carbon fiber products can also be addressed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method of flattening recycled carbon fiber material, the method comprising the steps of:
    establishing two flat plates arranged at an upper and a lower position corresponding to each other, each of said two flat plates having an upper surface and a lower surface;
    stacking a plurality of carbon fibers on the upper surface of the flat plate disposed at the lower position;
    disposing a first ultrasonic unit along said upper surface of the flat plate disposed at the upper position and a second ultrasonic unit along said lower surface of said flat plate disposed at the lower position, wherein at least one ultrasonic probe is arranged on each of the first and second ultrasonic units;
    wherein the at least one ultrasonic probe of the first ultrasonic unit and the at least one ultrasonic probe of said second ultrasonic unit cooperate with each other to emit vibrations transmitted through the carbon fibers stacked on the flat plate disposed at the lower position; and
    breaking up the carbon fibers stacked on the flat plate disposed at the lower position into a loose and flattened state by said vibrations emitted by said at least one ultrasound probe of said first ultrasound unit and said at least one ultrasound probe of said second ultrasound unit.

2. The method as claimed in claim 1, further comprising: connecting a lifting unit with the first ultrasonic unit disposed at the upper surface of the flat plate disposed at the upper position, said lifting unit being configured to drive said first ultrasound unit to descend towards a predetermined position, and to drive the flat plate disposed at the upper position to descend and press against the carbon fibers.

3. The method as claimed in claim 1, wherein each of the two flat plates includes a layout of a plurality of squares, and wherein each of said first and second ultrasonic units includes a plurality of the ultrasonic probes with each ultrasonic probe of the plurality thereof arranged in a respective square of the layout of the plurality of squares on a respective one of the two flat plates.

4. The method as claimed in claim 3, wherein the layout of the plurality of squares is a layout of nine squares arranged in a 3×3 matrix, and wherein each of said first and second ultrasonic units includes nine of the ultrasonic probes disposed in a 3×3 matrix corresponding to the nine squares of the respective one of said two flat plates.

5. The method as claimed in claim 1, wherein a frequency range of each of the at least one ultrasonic probe is 25-45 kHz.

6. The method as claimed in claim 1, wherein an ultrasonic strength of each of the at least one ultrasonic probe is 300-500 Watt.

7. A method of flattening recycled carbon fiber material, the method comprising the steps of:
    establishing two flat plates arranged at an upper and a lower position corresponding to each other, each of said two flat plates having an upper surface and a lower surface;
    stacking a plurality of carbon fibers on the upper surface of the flat plate disposed at the lower position;
    disposing a first ultrasonic unit along said upper surface of the flat plate disposed at the upper position and a second ultrasonic unit along said lower surface of said flat plate disposed at the lower position, wherein each of said first and second ultrasonic units includes a plurality of ultrasonic probes;
    wherein the plurality of ultrasonic probes of each of the first ultrasonic unit and the second ultrasonic unit are arranged in an array configuration spread uniformly across a respective one of said two flat plates, and wherein said plurality of ultrasonic probes of said first and second ultrasonic units cooperate with each other to emit vibrations transmitted through the carbon fibers stacked on the flat plate disposed at the lower position; and vibrating and breaking up the carbon fibers stacked on the flat plate disposed at the lower position into a loose and flattened state by said ultrasonic probes of said first and second ultrasonic units.

\* \* \* \* \*